United States Patent [19]
Macho

[11] 3,828,824
[45] Aug. 13, 1974

[54] DEVICE FOR ENGAGING AND DISENGAGING THE DOBBY SHAFT AND PICKING SHAFT OF LOOMS

[75] Inventor: Helmut Macho, Konstanz, Germany

[73] Assignee: Adolph Saurer Ltd., Arbon, Switzerland

[22] Filed: Nov. 27, 1972

[21] Appl. No.: 309,635

[30] Foreign Application Priority Data
Jan. 11, 1972 Switzerland.............................. 377/72

[52] U.S. Cl. ................. 139/1 E, 139/66 R, 139/142
[51] Int. Cl............................................ D03d 51/00
[58] Field of Search .......... 139/66 R, 1 E, 1 R, 336, 139/142

[56] References Cited
UNITED STATES PATENTS
3,356,109  12/1967  Neyraud.............................. 139/1 E
3,661,185   5/1972  Fumat................................. 139/1 E FOREIGN PATENTS OR APPLICATIONS
447,700   5/1936  Great Britain .................... 139/66 R
464,722   4/1937  Great Britain ..................... 139/336
1,061,940  3/1967  Great Britain ..................... 139/1 E Primary Examiner—James Kee Chi
Attorney, Agent, or Firm—McGlew and Tuttle

[57] ABSTRACT

The device includes means for permitting coupling of the dobby shaft and picking shaft in only two angular positions which are displaced by 180°, and includes an auxiliary shaft which is selectively driven either by an electric motor or by a hand operated chain and sprocket drive and which includes a cam for actuating a shifting lever for the purpose of moving a settable coupling member rotatable with the dobby shaft axially between two axially spaced positions. A first coupling is engageable to connect the coupling member to the drive member in a first axial position of the coupling member, and a second coupling is engageable to connect the coupling member to the auxiliary shaft in a second axial position of the coupling member. The drive member is driven by the picking shaft and is freely rotatable on the dobby shaft, and includes a roller which bears against a side of the settable coupling member to prevent it from engaging the first coupling except when a selected relative angular position of the settable coupling member and the drive member is attained. The cam actuates the shifting lever to displace the coupling member axially of the dobby shaft to disengage the first coupling and to engage the second coupling responsive to selective rotation of the auxiliary shaft. Springs normally bias the coupling member to engage the first coupling and to disengage the second coupling. When the shifting lever is moved to shift the coupling member to engage the second coupling, it actuates a switch connected in a circuit for the electric motor for selectively driving the auxiliary shaft.

7 Claims, 2 Drawing Figures

DEVICE FOR ENGAGING AND DISENGAGING THE DOBBY SHAFT AND PICKING SHAFT OF LOOMS

BACKGROUND OF THE INVENTION

1. Field of the Invention

This invention relates in general to the construction of looms and, in particular, to a new and useful device for engaging and disengaging the dobby shaft and the picking shaft of looms when they are in selected angular positions relative to each other, which angular positions are separated by 180°.

2. Description of the Prior Art

In the conventional looms, the disengagement, driving, adjustment and recoupling of the dobby shaft and the picking shaft is effected, for example, in case of a thread breakage or a change of weave, and this can only be accomplished in the known machines in a cumbersome manner since separate operations are required to disengage the connection, to turn the dobby shaft by hand when the connection is disengaged, and to establish the connection again after the broken warp thread has been repaired or the broken weft thread has been removed or a change to a different weave has been made. With this cumbersome operation, care must be taken that the weaving operation is resumed at the same angular position at which it had stopped. This requires special attention particularly in certain dobbies where the head motions are determined with lead by a control apparatus.

SUMMARY OF THE INVENTION

In accordance with the invention there is provided a device for engaging and disengaging the dobby and the picking shafts of looms which operates without the disadvantages of the prior art by permitting the disengagement of a connection of the dobby shaft and the picking shaft and the rotation of the dobby shaft by itself, and the subsequent recoupling of the two shafts in a single operation. This is achieved by an engagement mechanism which makes it possible to selectively engage the dobby shaft with either the picking shaft or an auxiliary shaft and wherein the coupling between the dobby shaft and the picking shaft is effected by disconnection of the dobby shaft from the auxiliary shaft only after the dobby shaft is oriented in the proper rotational position relative to the picking shaft.

In accordance with the invention the dobby shaft rotatably carries a drive member which is adapted to be connected to the picking shaft for rotation by the picking shaft, and this drive member carries a first portion of a first coupling which includes a second portion which is carried by a settable coupling member in the form of a gear which is secured to rotate with an extension of the dobby shaft, but which is axially slidable therealong. The auxiliary shaft includes a drive gear for rotating the settable coupling member and it also carries a cam which is engageable with a lever which effects the disengagement of the settable member coupling portion from the coupling portion of the drive member on the dobby shaft before it is rotated. The lever member is moved backwardly by the cam to permit the settable member to be returned under a spring force to effect engagement of the first and second coupling portions but only when the single settable coupling member has rotated to a predetermined angular position. This angular position is determined by engagement of pressure rollers against a cam surface defined on the side of the settable coupling member and formed to permit engagement only at two selected angular positions 180° apart. The second coupling is advantageously designed as two separate axially interlocking coupling parts in the form of gear elements, wherein one coupling part is formed by gear teeth on the coupling member, and the other coupling part is formed by a gear assembly on the auxiliary shaft which is rotationally elastic. The auxiliary shaft can be driven either manually or by means of an electric motor which advantageously includes a circuit which is controlled by a switch which is open when the dobby shaft and the picking shaft are coupled together.

Accordingly it is an object of the invention to provide an improved device for engaging and disengaging the dobby and picking shafts of looms where the dobby shaft and the picking shaft can be coupled only at two angular positions which are displaced by 180°.

A further object of the invention is to provide a device for engaging and disengaging the dobby and picking shafts of looms which includes a drive member carried rotatably by the dobby shaft which is driven by a settable coupling member carried on the dobby shaft for rotation therewith, but being axially displaceable thereon and which includes a coupling portion which is engageable with a coupling portion on the drive member, and wherein roller means are provided to prevent engagement of the coupling portions except at predetermined relative angular positions of the settable coupling member and the drive member.

A further object of the invention is to provide a device for engaging and disengaging the dobby and picking shafts in looms which is simple in design, rugged in construction and economical to manufacture.

For an understanding of the principles of the invention, reference is made to the following description of a typical embodiment thereof as illustrated in the accompanying drawing.

GENERAL DESCRIPTION OF THE PREFERRED EMBODIMENTS

Figure 1:
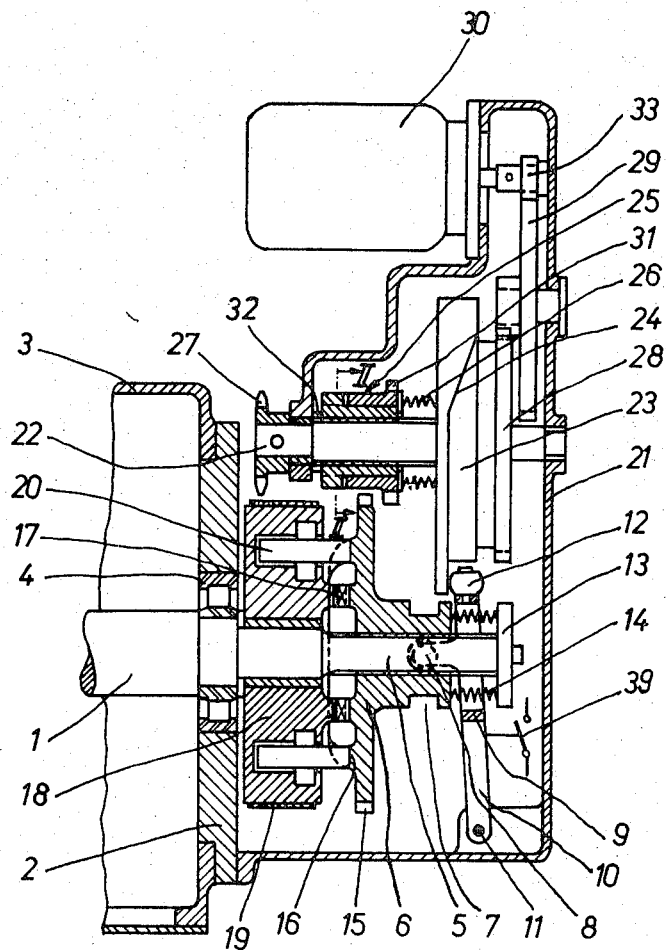
FIG. 1 is a partial, axial, sectional view of a device for engaging and disengaging the dobby and picking shafts in looms constructed in accordance with the invention.
Figure 2:
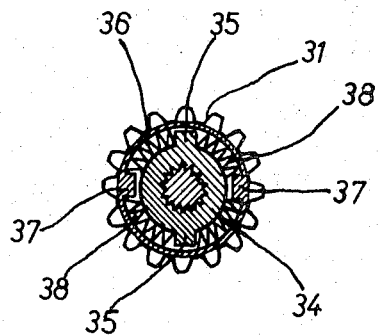
FIG. 2 is a section taken along the lines II—II of FIG. 1.

Referring to the drawing in particular, the invention embodied therein includes a loom which has a dobby shaft 1 which is rotatably supported in an end shield 2 of the dobby casing 3, on roller bearings 4. The dobby shaft 1 has a splined extension 5 which carries a setting gear member or coupling disk 6 which includes a grooved end portion or hub 7, and which is axially displaceable by means of an engagement face or bearing 8 engaged by a ring 9 carried on a pivotal lever 10. The pivotal lever 10 is pivotally mounted on a pivot pin 11 at one end and it includes an opposite end having a thrust bearing 12 which bears against a cam surface 24 of a disk member 23. The outer end of the extension portion 5 of the dobby shaft 1 carries a ring 13 and a compression spring 14 has one end bearing against the ring 13 and an opposite end which acts on the end bearing surface 8 of the setting gear member 6 to urge it in a direction toward a drive member in a form of a belt pulley 18 which is freely rotatable on an intermediate portion of the dobby shaft 1.

In accordance with the invention, the single settable gear or coupling member 6 has a gear rim 15 which is engageable with a gear rim 31 of a rotationally elastic sleeve member 25 which is carried on a hub 34 which is affixed to an auxiliary shaft 22 for rotation therewith.

The setting gear member 6 has a side surface with engagement claws or a first coupling part 17 thereon which engage with counter-claws on a second coupling part carried on a side face of the pulley 18. The pulley 18 is freely mounted on the dobby shaft 1 and it is connected by means of a belt 19 with the picking shaft (not shown) of the loom. Coupling engagement prevention means in the form of pressure rollers 20 are carried on radially extending axles of the pulley 18 and they engage against a bearing surface or cam 16 defined on the adjacent end face of the setting member 6. The profile on the cam surface 16 is such that the claws 17 interengage in only two angular positions of the setting member 6 and the belt pulley 18 and these two positions are angularly displaced by 180°. In all other positions the rollers engage against the cam surface 16 and cause the setting member 6 to be displaced away from the belt pulley 18 so that the claws are maintained out of engagement. The pressure rollers 20 and the bearing surface 16 form an engagement preventing means that prevent engagement of the claws except in the selected angular positions.

A housing 21 is secured on the dobby casing 3 and auxiliary shaft 22 is journaled for rotation on one of the housing walls. Disk 23 is secured on the auxiliary shaft 22 for rotation therewith and it carries the cam 24 with a gear rim 28. In addition the rotation elastic coupling sleeve generally designated 25 is engaged on the auxiliary shaft 22 in a fixed position for rotation therewith but it is axially displaceable. The sleeve 25 is biased by a spring 26 toward a fixed stop 32 of the shaft 22. The spring has an opposite end which bears against the disk 23. A chain wheel or sprocket 27 is secured on the intermediate shaft and it can be turned by means of a chain (not shown) and/or a hand wheel. The gear rim 28 meshes with a countershaft gear 29 which in turn is driven by a pinion 33 of an electromotor 30. The rotation elastic coupling 25 comprises the hub 34 having the engagement wings or teeth 35 and the outer sleeve 36 having the engagement wings 37. Compression springs 38 are provided between the wings 35 and 37. The outer sleeve 36 is provided with a gear rim 31 which can be brought into engagement with the gear rim 15 of the coupling disk 6. A switch 39 is arranged alongside the lever 10 and it is connected to the lever for movement therewith and is set so that it interrupts the current supply when the claws 17 of the setting gear member 6 and the belt pulley 18 are engaged.

The operation of the device is as follows:

With the loom standing still, that is, with the belt pulley 18 not turning, the disk 23 is set in rotation either by means of the chain wheel 27 or by means of the electromotor 30 driving through the pinion 33, the countershaft gear 29 and the gear rim 28. The end thrust bearing 12 is urged, by the spring 14 acting on the disk 13, in a direction toward engagement with the cam 24 so that it is displaced by the cam to move the setting gear member 6 against the force of the spring toward the ring 13. This causes the claws or engagement coupling parts 17 to move apart and subsequently the teeth of the rim 15 engage those of the rim 31. If the teeth of the rims 15 and 31 are just opposite each other, the rotation elastic sleeve 25 would be slightly displaced toward the cam disk 23 against the force of the compression spring 26 until the tooth and gap oppose each other, and the sleeve 25 would then resume its axial rest postion. During the further rotation of the axial shaft 22 the pressure point of the thrust bearing 12 on the longitudinal cam 24 again assumes its original axial position, and the setting gear member 6 is urged by the compression spring 14 into engagement with the pressure rollers 20 on the belt pulley 18. This causes the claws 17 to engage but only after the auxiliary shaft is rotated until the pressure rollers are in front of a depression of the bearing surface 16.

When the claws 17 are fully engaged, the switch 39 is opened by the lever 10 so that the current supply to the motor 30 is interrupted, and the auxiliary shaft 22 stops rotation. Thus, when the shaft 22 is operated by the motor 30 the throwing of the switch 39 causes the process to be automatically stopped.

If the adjustment of the dobby shaft relative to the picking shaft by more than 180° is desired, with the auxiliary shaft 22 which is driven by the motor 30, the switch 39 is bridged over by another switch (not shown) whose operating time can be set in advance in a known manner in dependence on the revolutions or half revolutions of the dobby shaft 1. The lever 10 and the switch 39 can also be connected with each other, for example, by means of a device provided with a counter, where the counter interrupts the connection so long until the desired number of switchings has taken place.

While specific embodiments of the invention have been shown and described in detail to illustrate the application of the principles of the invention, it will be understood that the invention may be embodied otherwise without departing from such principles.

What is claimed is:

1. In a loom having a rotatable dobby shaft driven by a picking shaft, a device for engaging and disengaging the two shafts in only two relative angular positions displaced angularly by 180°, said device comprising, in combination, a drive member mounted on said dobby shaft for free rotation thereon; a selectively rotatable auxiliary shaft; a single coupling member rotatable with said dobby shaft and displaceable axially thereof; a first coupling engageable to connect said single coupling member to said drive member in a first axial position of said single coupling member; a second coupling engageable to connect said single coupling member to said auxiliary shaft in a second axial position of said single coupling member, spaced from said first axial position thereof; means operable, responsive to selective rotation of said auxiliary shaft, to displace said single coupling member to engage one coupling and disengage the other coupling; and engagement preventing means on said single coupling member and said drive member preventing engagement of said first coupling except when said single coupling member and said drive member have a selected relative angular relation.

2. A device according to claim 1, in which said displacing means includes biasing means biasing said coupling member to its first axial position to engage said first coupling.

3. A device according to claim 2, in which said second coupling comprises a hub rotatable with said auxiliary shaft and having a gear thereon and a gear on said coupling member engageable with the gear on said hub; said displacing means comprising a cam rotatable with said auxiliary shaft and a lever having a cam follower portion engageable with said cam and connected to said coupling member to shift said coupling member axially, responsive to selective rotation of said auxiliary shaft, to displace said single coupling member to engage one coupling and disengage the other coupling.

4. A device according to claim 1, wherein said engagement prevention means comprises a pressure roller rotatably mounted on said drive member, said single coupling member having a cam surface engaged with said roller preventing engagement of said first coupling except when said roller rides on a depressed portion of said cam surface.

5. A device according to claim 1, wherein said first coupling comprises interengageable claws which interlock axially, at least two diametrically opposite rollers journalled about radial axes carried on said drive member, said single coupling member having an end face with a continuous cam surface engaged by said rollers, said cam surface having diametrically opposite recess portions permitting inward movement of said single coupling member toward said drive member to engage said first coupling.

6. A device according to claim 2, in which said second coupling comprises a hub rotatable with said auxiliary shaft and displaceable axially of said auxiliary shaft; means biasing said hub to one limiting axial position; an external ring gear embracing said hub adjacent one end of said hub; said single coupling member having an external gear engageable with said external ring gear responsive to movement of said single coupling member to its second axial position; and spring means engaged between said hub and said external ring gear and providing for limited relative angular displacement of said hub and said external ring gear.

7. A device according to claim 3, including a chain sprocket secured to said auxiliary shaft for selective manual rotation of said auxiliary shaft by a manually operable chain drive; an electric motor in driving connection with said auxiliary shaft; and switch means operable by said lever and included in a circuit of said motor, said lever opening said switch means responsive to movement of said single coupling member to its first axial position to engage said first coupling.

* * * * *